(12) United States Patent
Morita et al.

(10) Patent No.: US 6,565,971 B2
(45) Date of Patent: May 20, 2003

(54) FINE CARBON FIBER AND METHOD FOR PRODUCING THE SAME

(75) Inventors: Toshio Morita, Kanagawa (JP); Hitoshi Inoue, Kanagawa (JP); Yutaka Suhara, Nara (JP)

(73) Assignee: Showa Denko Kabushiki Kaisha, Tokyo (JP)

(*) Notice: Subject to any disclaimer, the term of this patent is extended or adjusted under 35 U.S.C. 154(b) by 0 days.

(21) Appl. No.: 09/986,438

(22) Filed: Nov. 8, 2001

(65) Prior Publication Data

US 2002/0058139 A1 May 16, 2002

Related U.S. Application Data
(60) Provisional application No. 60/267,177, filed on Feb. 8, 2001.

(30) Foreign Application Priority Data

Nov. 10, 2000 (JP) ........................................ 2000-381067

(51) Int. Cl.[7] .................................................. D01F 9/12
(52) U.S. Cl. .................. 428/367; 423/447.1; 423/447.2
(58) Field of Search ....................... 428/367; 423/447.1, 423/447.2

(56) References Cited

U.S. PATENT DOCUMENTS 4,663,230 A    5/1987  Tennent
5,641,466 A    6/1997  Ebbesen et al.

FOREIGN PATENT DOCUMENTS

| JP | 60-27700 A   |   | 2/1985  |
| JP | 60-54998 A   |   | 3/1985  |
| JP | 61-70014 A   |   | 4/1986  |
| JP | 7-150419 A   |   | 6/1995  |
| JP | 410125322 A  | * | 5/1998  |
| JP | 411307095 A  | * | 11/1999 |
| JP | 02001106518 A| * | 4/2001  |

* cited by examiner

Primary Examiner—N. Edwards
(74) Attorney, Agent, or Firm—Sughrue Mion, PLLC (57) ABSTRACT

A fine carbon fiber having a multilayer structure having stacked cylindrical carbon sheets and a center axis having a hollow structure. The fine carbon fiber has an outer diameter of 2 to 300 nm and an aspect ratio of 10 to 15,000, and at least one cylindrical carbon sheet layer among the multiple layers is folded at an end part of the carbon fiber and continued to another cylindrical carbon sheet. The folded and continued cylindrical carbon sheets form a cylindrical structure opened at the end part.

15 Claims, 5 Drawing Sheets

Fig. 1

--- Prior Art ---

FINE CARBON FIBER AND METHOD FOR PRODUCING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/267,177 filed Feb. 8, 2001 pursuant to 35 U.S.C. §111(b).

FIELD OF THE INVENTION

The present invention relates to a fine carbon fiber having a specific structure and also relates to a production process and an application of the carbon fiber. More specifically, the present invention relates to a fine carbon fiber suitable as a filler for composite materials of resin, rubber or the like, a semiconductor material, a catalyst and a field emission material, and also relates to a production process thereof.

BACKGROUND OF THE INVENTION

Carbon fiber is used in various composite materials because of its excellent properties such as high strength, high elastic modulus and high electric conductivity. With the progress of electronic technologies in recent years, carbon fiber is expected to be used as an electrically conductive resin filler for electromagnetic wave-shielding materials or antistatic materials or as a filler in a resin for use in an electrostatic coating by using not only the excellent mechanical properties of the carbon fiber, which have been heretofore utilized, but also the electrical conductivity of the carbon fiber or carbon material. Furthermore, the carbon material is expected to be used as a field emission material for a flat display and the like using of its properties such as chemical stability, thermal stability and fine structure.

Conventional carbon fiber is produced as a so-called organic carbon fiber which is obtained by heat-treating and carbonizing fiber such as PAN-(polyacrylonitrile), pitch- or cellulose-based fiber. In the case of using this carbon fiber as a filler for fiber reinforced composite materials, the carbon fiber is preferably reduced in its diameter or increased in its length, thereby enlarging the contact area with the matrix so as to elevate the reinforcement effect. Furthermore, for improving the adhesion to the matrix, the surface of the carbon fiber is preferably not smooth and is roughened to some extent by subjecting the surface of the carbon fiber to a surface treatment such as oxidation by exposure to air at a high temperature or coating or the like.

However, the organic fiber used as the starting material of this carbon fiber has a diameter of approximately from 5 to 10 µm and therefore, the produced carbon fiber cannot have a small diameter and is limited in the ratio of length to diameter (i.e., aspect ratio). Under these circumstances, there is a demand for the development of carbon fiber having a small diameter and a large aspect ratio.

When resin is used for an automobile body or when resin, rubber or the like is used for an electronic device, the resin, rubber or the like is required to have electrical conductivity comparable to metal. Accordingly, there is a demand that the carbon fiber used as a filler material also has higher electrical conductivity so that the requirements demanded in various electrically conductive coating materials, electrically conductive resin and the like, can be satisfied.

In order to have higher electrical conductivity, the carbon fiber must be graphitized and thereby improved in electrical conductivity. To improve electrical conductivity, the carbon fiber is usually graphitized at a high temperature. However, even by graphitization, the carbon fiber cannot have electrical conductivity comparable to metal. If the amount of carbon fiber blended is increased to compensate for this insufficient electrical conductivity, the obtained composite material disadvantageously decreases in workability and mechanical properties. Therefore, it is necessary to further improve the electrical conductivity of the carbon fiber itself or enhance the strength by reducing the diameter.

With respect to the use as a field emission material, studies have heretofore been made on the field emission by the Spint method. However, the production process by this method involves many steps and although the carbon fiber used for the electron emitting part is conventionally processed to have a needle-like tip using Mo or the like, the chemical stability and the thermal stability are not sufficiently high as an electron emitting material of a display.

In the late 1980's, studies have been made on vapor grown carbon fiber (hereinafter simply referred to as VGCF) of which the production process is utterly different from that of the organic fibers.

This VGCF is known to be obtained from the vapor-phase thermal decomposition of a gas such as hydrocarbon in the presence of an organic transition metallic catalyst, and a carbon fiber having a diameter of from hundreds of nm to 1 µm is obtained.

For example, a method where an organic compound such as benzene is used as a starting material and an organic transition metal compound as a catalyst, such as ferrocene, is introduced into a high-temperature reaction furnace together with a carrier gas to produce VGCF on a substrate (JP-A-60-27700 (the term "JP-A" as used herein means an "unexamined published Japanese patent application")), a method of producing VGCF in the free state (JP-A-60-54998), and a method of growing VGCF on a reaction furnace wall (Japanese Patent No. 2778434) are known.

According to these production processes, carbon fiber suitable as a filler material by having a relatively small diameter, an excellent electrical conductivity and a large aspect ratio can be obtained and in practice, carbon fiber having a diameter of approximately from 100 to 200 nm and an aspect ratio of approximately from 10 to 500 is mass-produced and used as an electrically conductive filler material in fillers for resin or in additive materials for lead storage batteries.

The VGCF is characterized by its shape and crystal structure. This fiber has a structure such that carbon hexagonal network surface crystals are stacked like annular rings to form a cylindrical shape, and the center part thereof forms a very narrow hollow moiety.

However, on a mass-production scale, VGCF having a small diameter of less than 100 nm cannot be produced.

Iijima, S., 1991, Nature, 354, 56, have discovered a multi-layer carbon nano-tube obtained from soot after the evaporation of a carbon electrode by arc discharge in a helium gas and this carbon fiber has a diameter smaller than that of VGCF. This multi-layer carbon nano-tube is a fine carbon fiber having a diameter of 1 to 30 nm, where, similarly to VGCF, carbon hexagonal network crystals are stacked like annular rings centered in the fiber axis and closed to form a cylindrical shape and the center part thereof has a hollow moiety.

This method using arc discharge is, however, not suitable for mass-production and not implemented in practice.

The vapor-phase process has a possibility of producing a carbon fiber having a large aspect ratio and a high electrical conductivity and studies are being made to improve this process with an attempt to produce a carbon fiber having a smaller diameter. U.S. Pat. No. 4,663,230 and JP-B-3-64606 (the term "JP-B" as used herein means an "examined Japanese patent publication") disclose a cylindrical carbon fibril comprising graphite and having a diameter of about 3.5 to about 70 nm and an aspect ratio of 100 or more. The structure thereof is such that continuous layers of regularly oriented carbon atoms are disposed concentrically about the axis of the cylinder to form multiple layers, the C-axis of each carbon atom layer is substantially orthogonal to the cylinder axis, a thermal carbon coating deposited by thermal decomposition is not contained in the entirety, and the surface is smooth.

JP-A-61-70014 discloses a vapor grown carbon fiber having a diameter of 10 to 500 nm and an aspect ratio of 2 to 30,000, where the thickness of the pyrolytic carbon layer is 20% or less of the fiber diameter.

These carbon fibers all have a smooth surface, and therefore, are poor in adhesive property, wettability and affinity, and when used as a composite material, the surface of the carbon fiber must be treated, for example, by thorough oxidation. Furthermore, when used as a field emission material, the tip of the carbon fiber must be thinned.

SUMMARY OF THE INVENTION

An object of the present invention is to provide a fine carbon fiber capable of serving as a filler material having high electrical conductivity and a diameter of less than 400 nm, preferably from 2 to 300 nm, and exhibiting good adhesive property to resin or the like.

A further object of the present invention is to provide such fine carbon fibers on a mass-production scale.

Another object of the present invention is to provide a chemically and thermally stable field emission material having an excellent electron emission property and a long life.

The present inventors have discovered a new fine carbon fiber having a structure different from conventional carbon fibers, including the production process thereof. The present invention provides the following embodiments.

(1) a fine carbon fiber comprising cylindrical carbon sheets stacked to form a multilayer structure with the center axis thereof having a hollow structure, the fine carbon fiber having an outer diameter of 2 to 300 nm and an aspect ratio of 10 to 15,000, wherein at least one cylindrical carbon sheet layer among the multiple layers is folded at an end part of the carbon fiber and continued to another cylindrical carbon sheet and the folded and continued cylindrical carbon sheets form a cylindrical structure opened at the end part;

(2) the fine carbon fiber as described in (1), wherein the folded and continued cylindrical carbon sheets are present in the peripheral part of the multilayer structure;

(3) the fine carbon fiber as described in (2), wherein a cylindrical carbon sheet closed at the end part is present inside the cylindrical structure formed by the folded and continued cylindrical carbon sheets;

(4) the fine carbon fiber as described in (3), wherein cylindrical carbon sheets folded and continued at the end part to form a cylinder opened at the end part of the carbon fiber are present further inside the cylindrical carbon sheet closed at the end part;

(5) a fine carbon fiber having an outer diameter of 2 to 300 nm and an aspect ratio of 10 to 15,000, wherein the fine carbon fiber described in any one of the (1) to (4) occupies about 5% by mass or more of the fine carbon fibers;

(6) a fine carbon fiber having an outer diameter of 2 to 300 nm and an aspect ratio of 10 to 15,000, wherein the fine carbon fiber as described in any of (1) to (4) occupies from about 5 to about 90% by mass of the fine carbon fibers;

(7) a fine carbon fiber having an outer diameter of from 2 to 300 nm and an aspect ratio of from 10 to 15,000, wherein when observed through a transmission electron microscope, the fine carbon fiber described in any one of the (1) to (6) occupies from about 3 to about 80% by volume in the fine carbon fibers;

(8) the fine carbon fiber as described in any one of the (1) to (7), wherein the fine carbon fiber is vapor grown carbon fiber;

(9) the fine carbon fiber as described in any one of the (1) to (8), wherein the carbon fiber comprises a boron atom;

(10) the fine carbon fiber as described in any one of the (1) to (9), wherein carbon atoms of the carbon fiber are partially displaced by boron atoms;

(11) a process for producing the fine carbon fiber described in any one of the (1) to (10), comprising heat-treating fine carbon fiber having an outer diameter of 2 to 300 nm and an aspect ratio of 10 to 15,000 and having a multilayer structure formed by cylindrical carbon sheets stacked one on another, with the center axis having a hollow structure;

(12) the process for producing the fine carbon fiber as described in (11), wherein the heat-treatment temperature is from about 2,000 to about 3,500° C.; and (13) the process for producing the fine carbon fiber as described in (11) or (12), wherein a boron compound is mixed with fine carbon fiber having an outer diameter of from 2 to 300 nm and an aspect ratio of from 10 to 15,000 and having a multilayer structure formed by cylindrical carbon sheets stacked one on another, with the center axis having a hollow structure, and the mixture is heat-treated.

DETAILED DESCRIPTION OF INVENTION

The present invention is described in detail below.

In the process of making investigations for a fine carbon fiber ensuring good electrical conductivity, having an outer diameter of less than 400 nm, preferably from 2 to 300 nm, more preferably from 1 to 80 nm, and as a filler material, exhibiting good adhesive property to resin or the like, a fine carbon fiber having a form not previously known is obtained by the graphitization of a fine VGCF by a high-temperature heat treatment in the presence of a boron compound. The obtained fine carbon fiber is found to have high electrical conductivity and excellent adhesive property to resin or the like and moreover, to provide a chemically and thermally stable field emission material having an excellent electron emission property and a long life. Furthermore, this fine carbon fiber having a novel form can be obtained by a heat treatment irrespective of the presence of a boron compound. It is considered that the fine carbon fiber of the present invention is fundamentally one form of carbon fibers obtained in the process of producing a carbon fiber having a smaller diameter and a higher graphitization degree.

The fine carbon fiber of the present invention is described below.

The characteristic features of the fine carbon fiber of the present invention is described by referring to the attached drawings (FIGS. 1 to 4). In the Figures, the carbon sheet (a layer of graphite or crystal close to graphite) is schematically shown by a solid line.

Figure 1:
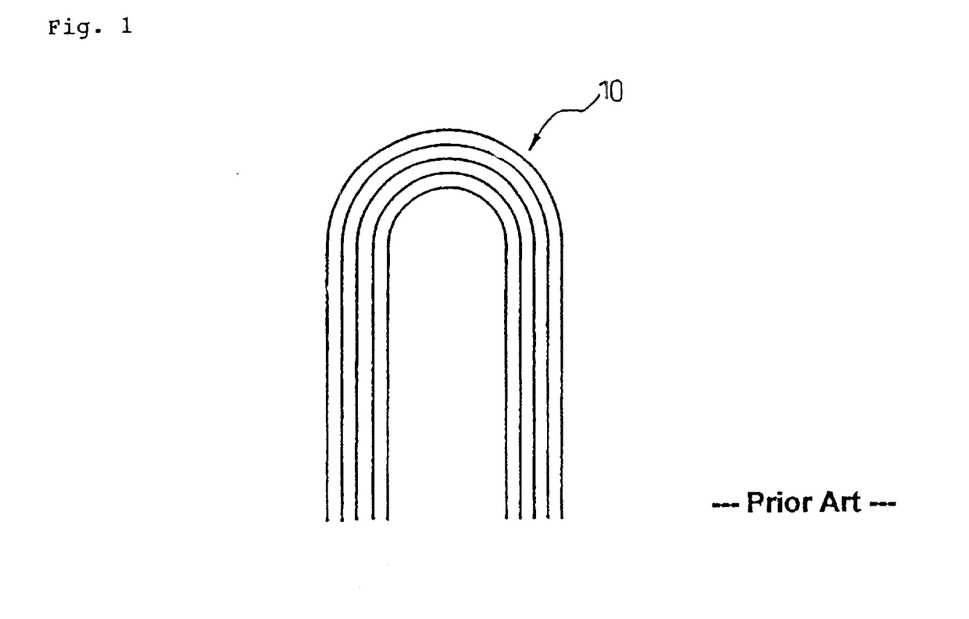
FIG. 1 is a schematic cross section for describing the structure of a conventional fine carbon fiber.

FIG. 1 is a cross-sectional view schematically showing a conventionally known fine carbon fiber having a diameter of less than 100 nm and an aspect ratio of 10 to 15,000, where cylindrical carbon sheets are stacked one on another to form a multilayer structure (annular ring structure) and the center axis has a hollow structure. In such a known fine carbon fiber, the cylindrical carbon sheets constituting the multilayer structure all are closed with a certain curvature at respective end parts. On the other hand, the fine carbon fiber of the present invention has the following structure.

Figure 2:
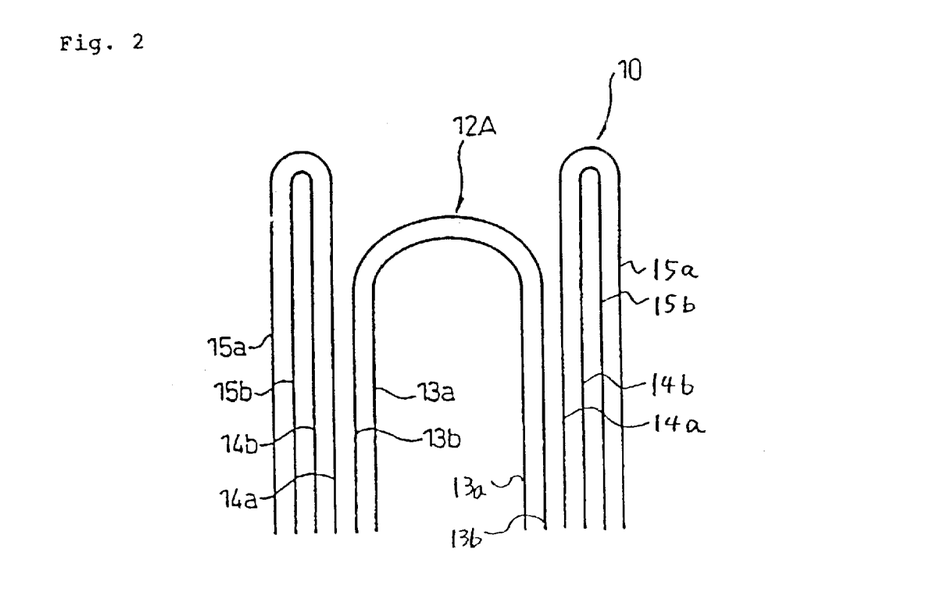
FIG. 2 is a schematic cross section for describing the structure of the fine carbon fiber of present invention.
Figure 4:
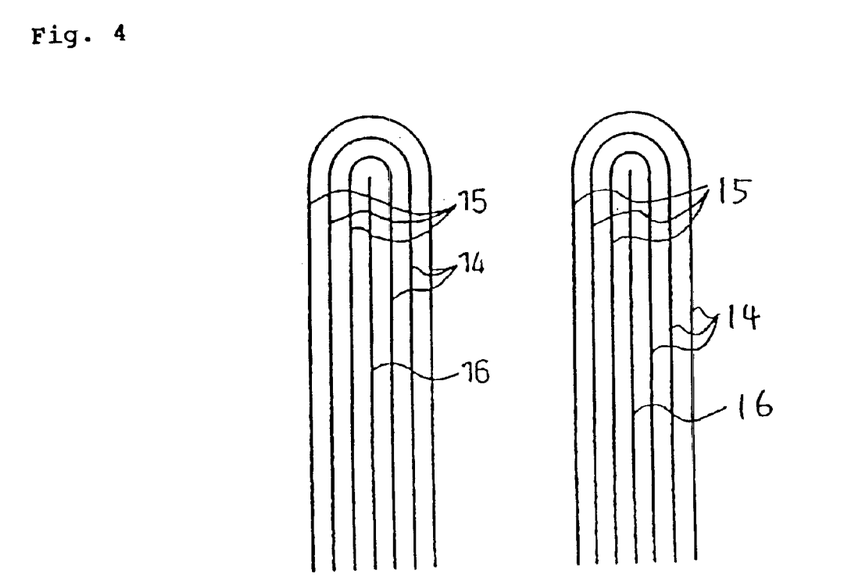
FIG. 4 is a schematic cross section for describing the structure of the fine carbon fiber of present invention.

1) FIG. 2 and FIG. 4 each shows a view of a fine carbon fiber characterized in that the fine carbon fiber 10 comprises cylindrical carbon sheets stacked one on another to form a multilayer structure with the center axis being in a hollow structure and has an outer diameter of 2 to 300 nm and an aspect ratio of 10 to 15,000. At least one cylindrical carbon sheet 14, (in FIG. 2, two cylindrical carbon sheets are shown as 14a and 14b and in FIG. 4, three cylindrical carbon sheets are shown, each designated as 14) among the multiple layers is folded at the end part of the carbon fiber and continued to another cylindrical carbon sheet 15 (in FIG. 2, two cylindrical sheets are shown as 15a and 15b as continued from sheets 14a and 14b, respectively, and in FIG. 4, three cylindrical sheets are shown, each designated as 15, as continued from the three sheets 14). The cylinder formed by the folded and continued cylindrical carbon sheets 14 and 15 (in FIG. 2, cylindrical carbon sheets 14a and 15a are folded and continued with each other, and cylindrical carbon sheets 14b and 15b are folded and continued with each other) is opened at the end part of the carbon fiber. When a conventional fine carbon fiber is oxidized, the tip of the fiber is sometimes forcedly broken (see, U.S. Pat. No. 5,641,466) and since this is not the graphite-forming condition, the carbon fiber is not folded and continued.

2) Referring to FIG. 2, in the fine carbon fiber of 1) above, the folded and continued cylindrical carbon sheets 14a and 15a and 14b and 15b are present at the peripheral part of the multilayer structure.

3) Referring to FIG. 2 and the fine carbon fiber of 2) above, at least one cylindrical carbon sheet 13 (in FIG. 2, two cylindrical carbon sheets are shown as 13a and 13b) closed at the end part 12A is present inside the cylinders formed by the folded and continued cylindrical carbon sheets (in FIG. 2, cylindrical carbon sheets 14a and 15a are folded and continued with each other, and cylindrical carbon sheets 14b and 15b are folded and continued with each other). In general, the cylinder constituted by folded and continued carbon sheets is liable to be present in the peripheral part of the multilayer structure but in the inside thereof, a cylindrical carbon sheet is further present and the end part 12A thereof is closed in many cases.

Figure 3:
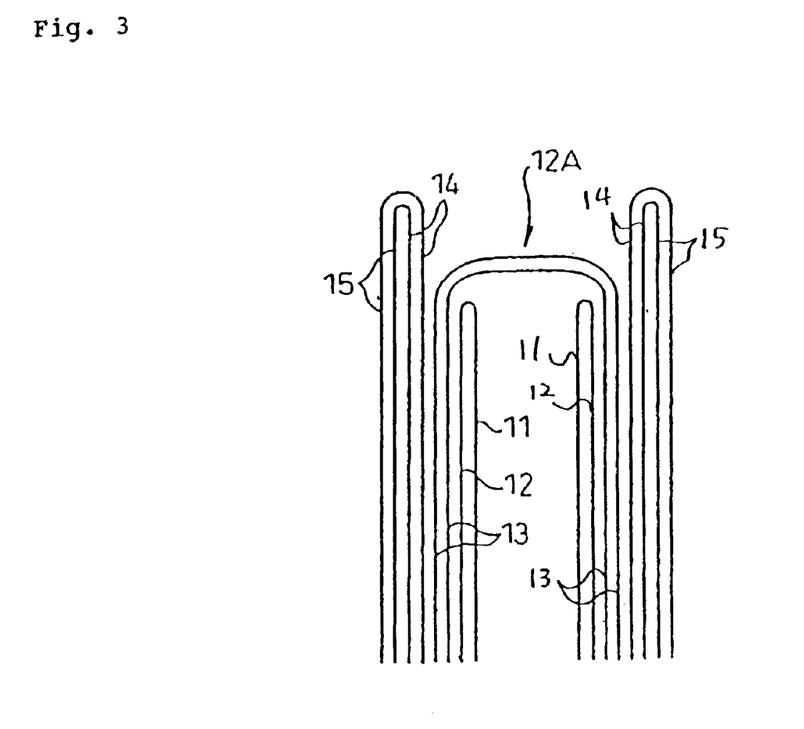
FIG. 3 is a schematic cross section for describing the structure of the fine carbon fiber of present invention.

4) Referring to FIG. 3, in the fine carbon fiber of 3) above, cylindrical carbon sheet 11 folded at the end part and continued to cylindrical carbon sheet 12 to form a cylinder opened at the end part of the carbon fiber are present further inside the cylindrical carbon sheets 13 closed at the end part.

5) Referring to FIG. 4, the fine carbon fiber comprises a cylinder constructed by folded and continued carbon sheets 14 and 15. The fine carbon fiber can be comprised of only a cylinder constructed by folded and continued carbon sheets, or as shown in FIG. 4, an unfolded carbon sheet 16 may be present somewhere in the inside of the cylinder constructed by the folded and continued carbon sheets 14 and 15. The presence of an unfolded carbon sheet 16 somewhere in the inside of a cylinder constructed by the folded and continued carbon sheets 14 and 15 is not limited to the embodiment shown in FIG. 4, but can be present in other embodiments. A carbon fiber having a form opened at the end part is obtained.

6) In a fine carbon fiber having an outer diameter of 2 to 300 nm and an aspect ratio of 10 to 15,000, the fine carbon fiber described in any one of 1) to 5) above occupies about 5% by mass or more of the fine carbon fibers.

In the foregoing, typical forms of the fine carbon fiber of the present invention are described, however, the fine carbon fiber of the present invention has at least one cylindrical carbon sheet among the multiple layers folded at the end part of the carbon fiber and continued to another cylindrical carbon sheet and the cylinder formed by the folded and continued cylindrical carbon sheet is opened at the end part of the carbon fiber. Other features may be freely changed. For example, the number of the cylindrical carbon sheet layer folded at the end part of the carbon fiber and continued to another cylindrical carbon sheet may be one, but two or more adjacent cylindrical carbon sheets each may be folded and continued to another cylindrical carbon sheet. Also, the cylindrical carbon sheets each folded and continued may or may not be adjacent to one another. For example, in FIG. 4, the cylindrical carbon sheet 14 and the cylindrical carbon sheet 15 are folded and continued but these are not adjacent to each other with an intervention of a cylindrical carbon sheet 16 between the cylindrical carbon sheet 14 and the cylindrical carbon sheet 15.

Furthermore, even when an amorphous carbon is present at the end part or in the periphery of the carbon fiber constructed by the carbon sheets, the fine carbon fiber of the present invention is not affected.

With respect to the structure of the fine carbon fiber moiety, the fine carbon fiber of the present invention has a multilayer structure where cylindrical carbon sheets comprising carbon atoms are stacked and in the center axis, a hollow cavity is present. The carbon sheet is formed of regularly oriented and continued carbon atoms and when observed from the longitudinal and right angled direction of the fiber, the carbon sheets are linearly multiplied almost in the fiber direction but in some parts, the cylindrical sheet is broken and disrupted in the longitudinal direction. Also, the center axis hollow part may not have a constant inner diameter.

These forms of the fine carbon fiber of the present invention are novel and have been not reported for conventional carbon fibers produced by various vapor-phase processes.

In the fine carbon fiber of the present invention, the end part has a characteristic feature not seen in conventional carbon fibers and a portion further thinned in the end part as compared with conventional carbon fibers is present. As the end part is thinner, for example, in FIG. 3 the folded and continued cylindrical carbon sheets 14 and 15 has an outer diameter of about 3 nm, the electrically conducting substance can have clearer directivity in the electron emission and the applied field can be more concentrated. As a result, the substance can be improved in field emission properties and suited as a field emission element. Furthermore, the fine carbon fibers are different in the shape of the end part and therefore, when used as an electrically conducting filler or the like, the adhesive property to resin or the like is effectively improved.

When the fine carbon fiber of the present invention is contained in an amount of about 5% by mass or more, suitably from about 5 to about 90% by mass, preferably from about 10 to about 70% by mass, more preferably from about 10 to about 50% by mass based on the amount of the fine carbon fibers, the field emission properties are improved by virtue of the structure of the fine carbon fiber and when used as an electrically conducting filler or the like, the adhesive property to resin or the like is effectively improved. By observation through a transmission electron microscope, the structure of the fine carbon fiber can be confirmed and when the fine carbon Fiber of the present invention is contained in an amount of about 3 to about 80% by volume, suitably from about 5 to about 70% by volume, preferably from about 10 to about 50% by volume based on the amount of the fine carbon fibers, the field emission properties are improved and when used as an electrically conducting filler or the like, the adhesive property to resin or the like is effectively improved.

The fine carbon fiber of the present invention has an outer diameter of from 2 to 300 nm and an aspect ratio of from 10 to 15,000 and since a long fiber can be thus obtained, the fine carbon fiber can be added as a filler material in a large amount and an excellent reinforcement effect can be obtained.

Furthermore, the carbon fiber having the above-described structure allows the end parts of the peripheral carbon sheets to protrude above the carbon sheets in the intermediate part, and therefore, when used as an additive material for batteries, ions can be efficiently captured. In addition, the electrical conductivity is equal to that of conventional vapor grown carbon fibers and moreover, since the surface is not smooth, good wettability to an electrolytic solution of a battery can be exhibited. Accordingly, the fine carbon fiber of the present invention is suitable as an additive material for batteries.

The fine carbon fiber having a specific form of the present invention may be produced by any method insofar as it is a method for producing a fine carbon fiber having a high graphitization degree. However, a suitable method for producing the fine carbon fiber of the present invention is described below.

The fine carbon fiber of the present invention is generally produced by thermally decomposing an organic compound, particularly a hydrocarbon, using a transition metal catalyst to obtain a crude fine carbon fiber and further heat-treating the crude fine carbon fiber at about 2,000 to about 3,500° C., preferably from about 2,500 to about 3,500° C. The reason why the fine carbon fiber has the above-described folded structure is considered to be because the distance between carbon sheets is reduced. For example, the lattice distance ($C_o$) of the carbon structure in which the hexagon network layers are laminated is reduced from about 0.69 nm to about 0.672–0.678 nm. Therefore, by employing conditions to reduce the distance between carbon sheets, the fine carbon fiber of the present invention can more easily be obtained. In this regard, it is advantageous to allow a boron compound to be present at the time of heat-treating the crude fine carbon fiber. When a boron compound is present together with the crude fine carbon fiber, the heat-treatment temperature can be lowered by hundreds of °C. as compared with the case of not adding the boron compound. When the same heat-treatment temperature is employed, the ratio of the peripheral portion to the fiber size can be increased as compared with the case of not adding the boron compound. The boron compound may be any substance insofar as it produces boron upon heating and examples thereof include boron carbide, boron oxide and organic boron oxide. The substance may be a solid, a liquid or a gas.

At first, a crude fine carbon fiber is obtained by thermally decomposing an organic compound, particularly a hydrocarbon, using a transition metal catalyst.

An organic transition metal compound comprises a transition metal which becomes a catalyst. Examples of the organic transition metal compound include organic compounds comprising a metal belonging to Groups IVa, Va, VIa, VIIa and VIII of the periodic table. Of these, compounds such as ferrocene and nickelocene are preferred. The amount of the organic transition metal compound contained as the catalyst is from about 0.01 to about 15% by mass, preferably from about 0.03 to about 10% by mass, more preferably from about 0.1 to about 5% by mass, based on the amount of carbon in the organic compound.

In addition, a sulfur compound is used as a co-catalyst but the form thereof is not particularly limited and any sulfur compound may be used insofar as it dissolves in an organic compound as a carbon source. Examples of the sulfur compound which can be used include thiophene, various thiols and inorganic sulfur. The amount of the sulfur compound used is from about 0.01 to about 10% by mass, preferably from about 0.03 to about 5% by mass, more preferably from about 0.1 to about 4% by mass, based on the organic compound.

Examples of the organic compound as a starting material of the carbon fiber, which can be used, include organic compounds such as benzene, toluene, xylene, methanol, ethanol, naphthalene, phenanthrene, cyclopropane, cyclopentane and cyclohexane, oils such as volatile oil and kerosene, gases such as CO, natural gas, methane, ethane, ethylene and acetylene, and a mixture thereof. Of these, aromatic compounds such as benzene, toluene and xylene are particularly preferred.

A carrier gas is employed which is usually a reducing gas including hydrogen gas. The carrier gas is preferably heated in advance to about 500 to about 1,300° C. This heating is performed to produce a catalyst metal at the reaction coincidentally with the supply of carbon source by the thermal decomposition of a carbon compound, thereby causing the reaction instantaneously, and to obtain a finer carbon fiber.

When mixing the carrier gas with the starting material, if the temperature of the heated carrier gas is less than about 500° C., the thermal decomposition of the starting material carbon compound is difficult to occur, whereas if the temperature exceeds about 1,300° C., the carbon fiber grows in the diameter direction and is liable to have a large diameter.

The amount of the carrier gas used is suitably from 1 to 70 parts by mol per 1.0 part by mol of the organic compound as the carbon source. The diameter of the carbon fiber can be controlled by changing the ratio between the carbon source and the carrier gas.

The starting material is prepared by dissolving an organic transition metal compound and a co-catalyst sulfur compound in the organic compound as the carbon source. The starting material in the liquid form may be sprayed as it is with the carrier gas and fed to the reaction furnace, but may also be vaporized using a part of the carrier gas as a purge gas and then fed to the reaction furnace to cause a reaction. In the case of obtaining a carbon fiber having a small fiber diameter, the starting material is preferably vaporized and then fed to the reaction furnace.

The reaction furnace used is usually a vertical electric furnace. The reaction furnace temperature is from about 800 to about 1,300° C., preferably from about 1,000 to about 1,300° C. The starting material solution and the carrier gas, or the starting material gas obtained by vaporizing the starting material and the carrier gas are fed to the reaction furnace, which is elevated to a predetermined temperature, and reacted to obtain a carbon fiber.

The gas blown into the reaction furnace is thermally decomposed, whereupon the organic compound serves as a carbon source and the organic transition metal compound is formed into a particulate transition metal as a catalyst. Using the thus-formed transition metal particles as nuclei, fine carbon fibers are produced.

The obtained fine carbon fiber is further heat-treated at about 900 to about 1,500° C. in an atmosphere of inert gas such as helium or argon and then heat-treated at about 2,000 to about 3,500° C., or the fine carbon fiber in the state immediately after the reaction can be heat-treated directly at about 2,000 to about 3,500° C., whereby the specific fine carbon fiber of the present invention can be obtained.

However, the specific fine carbon fiber of the present invention can be more easily obtained by mixing a boron compound such as boron carbide ($B_4C$), boron oxide ($B_2O_3$), elementary boron, boric acid ($H_3BO_3$) or borate, with the fine carbon fiber in the state immediately after the reaction or with the fine carbon fiber heat-treated at about 900 to about 1,500° C. in an inert gas atmosphere, and then further heat-treating the mixture at about 2,000 to about 3,500° C. in an inert gas atmosphere. The amount of the boron compound added depends on the chemical or physical properties of the boron compound used and is not limited, however, for example, in the case of using boron carbide ($B_4C$), the amount added is from about 0.05 to about 10% by mass, preferably from about 0.1 to about 5% by mass, based on the mass of the fine carbon fiber.

The term "boron is contained in the fine carbon fiber" as used herein means a state where boron is partially solid-dissolved and present on the surface of carbon fiber, between the stacked carbon hexagonal network layers or in the hollow part or where the carbon atoms are partially displaced by a boron atom.

EXAMPLE

The present invention is described in greater detail below by referring to the Example, which is not intended to limit the scope of the present invention and should not be construed as doing so. Unless indicated otherwise herein, all parts, percents, ratios and the like are by mass.

Figure 5:
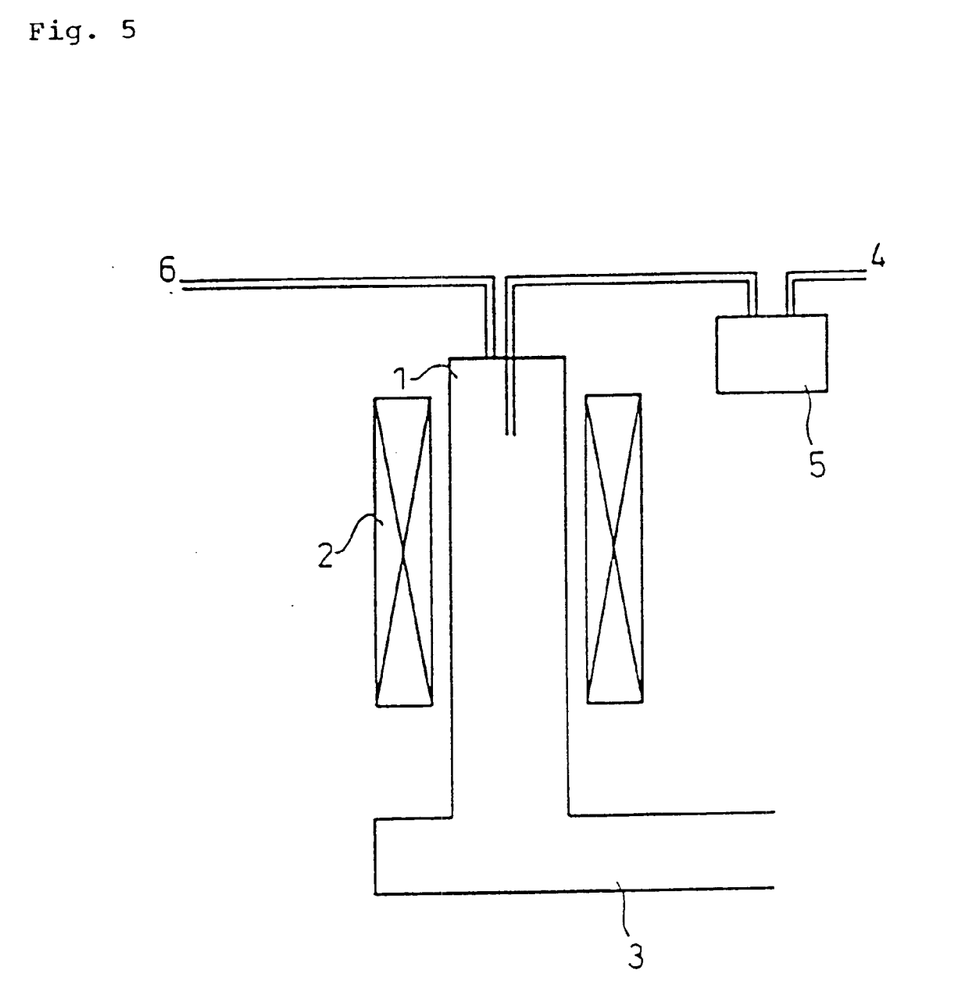
FIG. 5 is a schematic view showing an apparatus for use in the production described in the Example of the present invention.

As shown in the schematic view of FIG. 5, a starting material feed pipe 4 for feeding a starting material vaporized in a starting material vaporizer 5, and a carrier gas feed pipe 6 were connected to the top of a vertical heating furnace 1 (inner diameter: 170 mm, length: 1,500 mm). The vertical heating furnace 1 is provided with one or more heaters 2 for heating the furnace and with a starting material recovery system 3.

Figure 6:
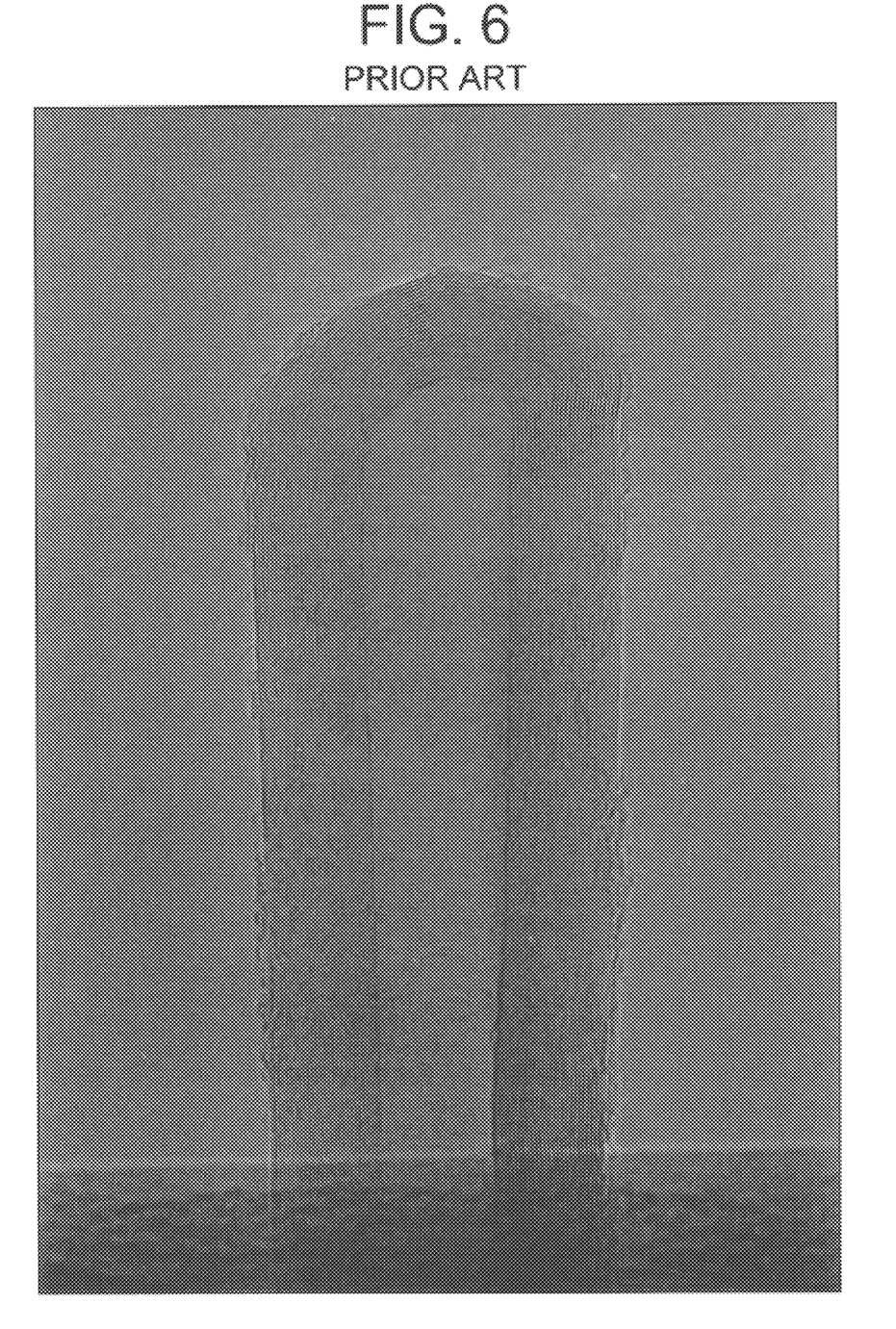
FIG. 6 is a transmission electron microscope photograph (magnification: 2,000,000 times) of a conventional fine carbon fiber.

A toluene solution having dissolved therein 3% by mass of ferrocene and 1% by mass of thiophene was vaporized and fed through the starting material feed pipe 4 at a rate of 20 g/min and hydrogen as a carrier gas was fed at a rate of 75 l/min, thereby performing the reaction. FIG. 6 shows a transmission electron microscope photograph of the fine carbon fiber obtained by this reaction.

The fine carbon fiber obtained by the reaction was heat-treated at 1,300° C. in an Ar (argon) atmosphere and the fiber treated at 1,300° C. was further heat-treated at 2,800° C. in an Ar atmosphere to obtain a fine carbon fiber in a recovery by mass of 96%. The lattice distance ($C_o$) is 0.68–0.675 nm.

Figure 7:
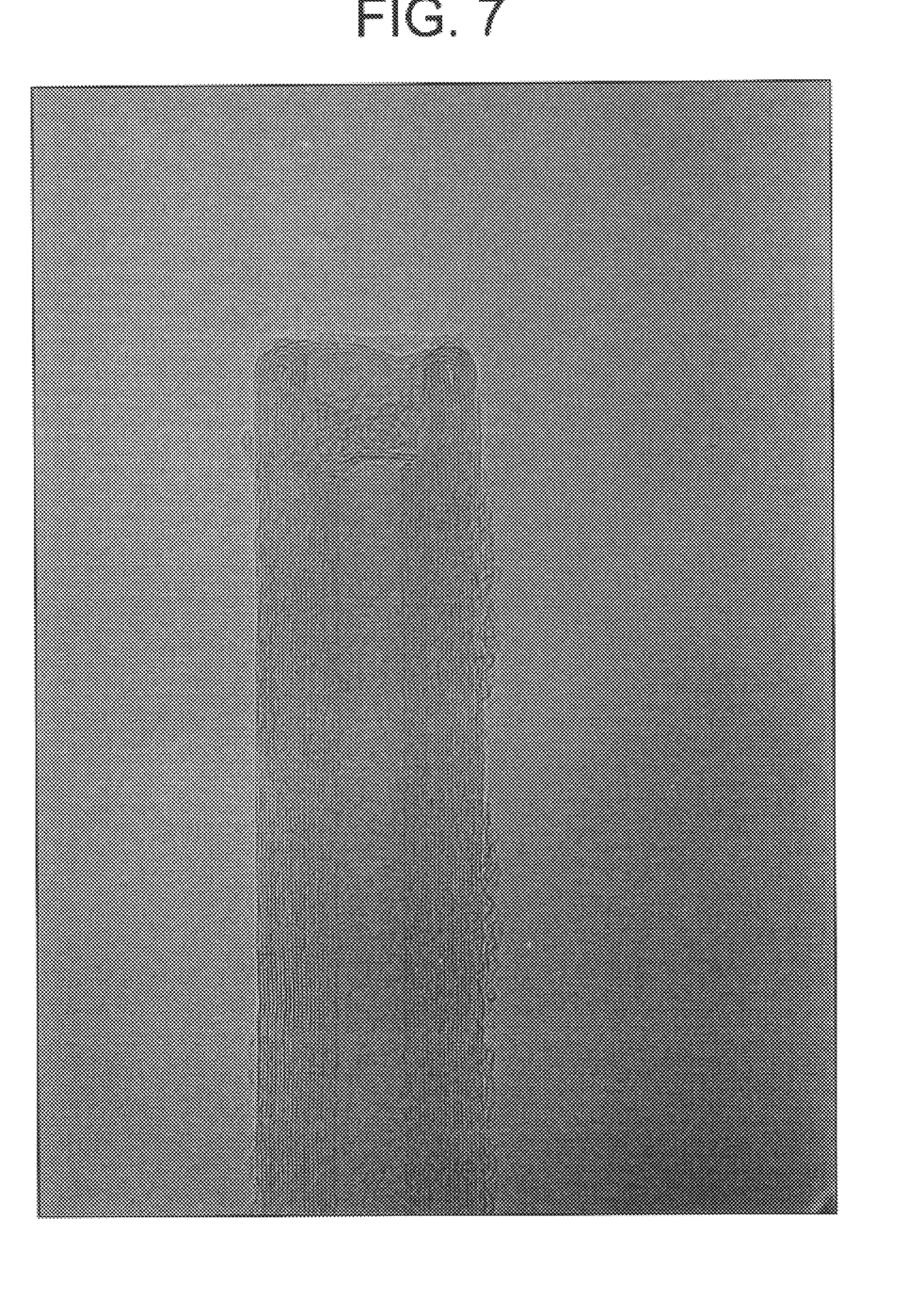
FIG. 7 is a transmission electron microscope photograph (magnification: 2,000,000 times) of a heat-treated fine carbon fiber of the present invention, which is heat-treated using a boron compound.

Separately, the fine carbon fiber heat-treated above at 1,300° C. in an Ar atmosphere was mixed with 4% by mass as $B_4C$ and then heat-treated at 2,800° C. in an Ar atmosphere to obtain a fine carbon fiber in a recovery by mass of 94%. The lattice distance ($C_o$) is 0.672 nm. FIG. 7 shows a transmission electron microscope photograph of the obtained carbon fiber.

In both FIG. 6 and FIG. 7, a multilayer structure is shown where cylindrical carbon sheets comprising carbon atoms are stacked one on another, and the center axis thereof has a hollow structure. However, in FIG. 6, the end part is closed as in the schematic view of FIG. 1, whereas in FIG. 7, a multilayer structure having a form corresponding to the schematic view of FIG. 3 is shown.

More specifically, in FIG. 7, the fine carbon fiber has a peripheral part (corresponding to 14, 15 of FIG. 3) forming a cylinder having an opened end, an intermediate part (corresponding to 13 of FIG. 3) having a closed end, and inside the intermediate part, a cylinder (corresponding to 11, 12 of FIG. 3) having an opened end. The carbon sheets (corresponding to 14, 15 and 11, 12 of FIG. 3) constituting the outer side and the inner side of the multiplayer structure, respectively, are each folded at the terminal end and connected to each other. The carbon sheets (corresponding to 13 of FIG. 3) lying in the intermediate part between the folded carbon sheets in the outer side and the inner side of the multilayer structure have a closed end (corresponding to 12A of FIG. 3). In FIG. 7, a carbon sheet is observed in the cross-sectional direction of the fiber at the end part of the carbon fiber. However, this is not the carbon sheet and the folded part of the carbon sheet in the peripheral part is viewed like a carbon sheet and the carbon sheet is not present in the axial center part of the fiber. Similar, in FIG. 7, in the end part of the carbon fiber, it appears as if the upper part of the carbon sheet at the closed end part of the intermediate carbon sheet is not a cavity but some substance is present, but this is an amorphous carbon attached to that portion and has no relationship with the structure of the carbon fiber. It is seen that amorphous carbon is present also on the surface in the circumferential part of the carbon fiber.

At this time, fibers having an outer diameter of about 10 to about 100 nm and an aspect ratio of tens or more were produced. Furthermore, when observed through a transmission electron microscope, fibers having the above-described characteristic features were found to occupy half the number or more (hereinafter "half the number or more means "60% or more by number").

According to the present invention, unlike conventional carbon fibers or vapor grown carbon fibers, the fine carbon fiber obtained is characterized in that the outer diameter is from 2 to 300 nm, suitably from 5 to 200 nm, and preferably from 10 to 100 nm, the aspect ratio is from 10 to 15,000, suitably from 10 to 5,000, and preferably from 20 to 1,000, at least one cylindrical carbon sheet among the multiple layers is folded at the end part of the carbon fiber and continued to another cylindrical carbon sheet, and the folded and continued cylindrical carbon sheets form a cylinder opened at the end part. This fine carbon fiber is useful as an electrically conducting filler for the field emission, gas occlusion using, for example, $H_2$, $CH_4$, $C_2H_4$, etc, or resin.

While the invention has been described in detail and with reference to specific embodiments thereof, it will be apparent to one skilled in the art that various changes and modifications can be made therein without departing from the spirit and scope thereof.

What is claimed is:

1. A fine carbon fiber comprising a multilayer structure comprising stacked cylindrical carbon sheets and a center axis having a hollow structure, wherein the fine carbon fiber has an outer diameter of 2 to 300 nm and an aspect ratio of 10 to 15,000, and wherein at least one cylindrical carbon sheet layer among the multiple layers is folded at an end part of the carbon fiber and continued to another cylindrical carbon sheet and the folded and continued cylindrical carbon sheets form a cylindrical structure opened at the end part.

2. The fine carbon fiber as claimed in claim 1, wherein the folded and continued cylindrical carbon sheets are present in a peripheral part of the multilayer structure.

3. The fine carbon fiber as claimed in claim 1 or 2, wherein a cylindrical carbon sheet closed at the end part is present inside the cylindrical structure formed by the folded and continued cylindrical carbon sheets.

4. The fine carbon fiber as claimed in claim 3, wherein cylindrical carbon sheets folded and continued at the end part to form a cylinder opened at the end part of the carbon fiber are present further inside the cylindrical carbon sheet closed at the end part.

5. Fine carbon fibers having an outer diameter of 2 to 300 nm and an aspect ratio of 10 to 15,000, wherein the fine carbon fiber according to claim 1 comprises about 5% by mass or more of the fine carbon fibers.

6. Fine carbon fibers having an outer diameter of 2 to 300 nm and an aspect ratio of 10 to 15,000, wherein the fine carbon fiber according to claim 1 comprises about 5 to about 90% by mass or more of the fine carbon fiber in the fine carbon fibers.

7. Fine carbon fibers having an outer diameter of 2 to 300 nm and an aspect ratio of 10 to 15,000, wherein the fine carbon fiber according to claim 1 occupies from about 3 to 80% by volume in the fine carbon fibers when observed through a transmission electron microscope.

8. The fine carbon fiber as claimed in claim 1, wherein the fine carbon fiber is vapor grown carbon fiber.

9. The fine carbon fiber as claimed in claim 1, wherein the carbon fiber comprises a boron atom.

10. The fine carbon fiber as claimed in claim 1, wherein carbon atoms of the carbon fiber are partially displaced by boron atoms.

11. A process for producing a fine carbon fiber comprising a multilayer structure comprising stacked cylindrical carbon sheets and a center axis having a hollow structure, wherein the fine carbon fiber has an outer diameter of 2 to 300 nm and an aspect ratio of 10 to 15,000, and wherein at least one cylindrical carbon sheet layer among the multiple layers is folded at the end part of the carbon fiber and continued to another cylindrical carbon sheet and the folded and continued cylindrical carbon sheets form a cylindrical structure opened at the end part, said process comprising:

heat-treating a fine carbon fiber having an outer diameter of 2 to 300 nm and an aspect ratio of 10 to 15,000, and having a multilayer structure formed by cylindrical carbon sheets stacked one on another, with the center axis having a hollow structure.

12. The process for producing the fine carbon fiber as claimed in claim 11, wherein the heat-treatment temperature is from about 2,000 to about 3,500° C.

13. The process for producing the fine carbon fiber as claimed in claim 11 or 12, further comprising a boron compound with the carbon fiber that is subjected to the heat treatment.

14. The process according to claims 11 or 12, wherein the fine carbon fiber that is subjected to the heat treatment is formed by vapor phase thermal decomposition of an organic compound, using a transition metal catalyst.

15. The process according to claim 13, wherein the fine carbon fiber that is subjected to the heat treatment is formed by vapor phase thermal decomposition of an organic compound, using a transition metal catalyst.

* * * * *